(12) United States Patent
Namoun

(10) Patent No.: US 7,689,395 B2
(45) Date of Patent: Mar. 30, 2010

(54) 6-AXIS ROAD SIMULATOR TEST SYSTEM

(76) Inventor: Faycal Namoun, 1, Parc de Lattre de Tassigny, Courberoie (FR) 92400

( * ) Notice: Subject to any disclaimer, the term of this patent is extended or adjusted under 35 U.S.C. 154(b) by 1111 days.

(21) Appl. No.: 10/988,419

(22) Filed: Nov. 12, 2004

(65) Prior Publication Data

US 2005/0120783 A1 Jun. 9, 2005

Related U.S. Application Data

(63) Continuation-in-part of application No. PCT/IB03/02372, filed on May 14, 2003.

(60) Provisional application No. 60/380,401, filed on May 14, 2002.

(51) Int. Cl.
*G06G 7/48* (2006.01)

(52) U.S. Cl. .......................................... 703/8

(58) Field of Classification Search ............... 703/8; 434/69; 73/116.08
See application file for complete search history.

(56) References Cited

U.S. PATENT DOCUMENTS

| | | | |
|---|---|---|---|
| 3,520,180 A | 7/1970 | Ris et al. | |
| 3,828,614 A | 8/1974 | Borg | |
| 4,051,742 A * | 10/1977 | Johansson et al. | 474/104 |
| 4,161,116 A * | 7/1979 | Fegraus et al. | 73/117 |
| 4,292,904 A * | 10/1981 | Brandt | 110/198 |
| 4,953,391 A | 9/1990 | Schober et al. | |
| 5,111,685 A | 5/1992 | Langer | |
| 5,133,211 A * | 7/1992 | Brown et al. | 73/115.07 |
| 5,942,673 A | 8/1999 | Konno et al. | |
| 6,126,512 A * | 10/2000 | Chao et al. | 451/9 |
| 6,134,957 A * | 10/2000 | Fricke et al. | 73/146 |
| 6,247,348 B1 | 6/2001 | Konno et al. | |
| 6,304,835 B1 * | 10/2001 | Hiramatsu et al. | 703/8 |
| 6,321,507 B1 * | 11/2001 | Copeland et al. | 53/118 |
| 6,427,528 B1 | 8/2002 | Konno et al. | |

FOREIGN PATENT DOCUMENTS

| | | |
|---|---|---|
| DE | 19629739 | 2/1998 |
| FR | 2647168 A1 * | 11/1990 |
| JP | 59180447 | 10/1984 |
| JP | 06249755 | 9/1994 |

* cited by examiner

*Primary Examiner*—Paul L Rodriguez
*Assistant Examiner*—Eunhee Kim
(74) *Attorney, Agent, or Firm*—Harness, Dickey & Pierce, P.L.C.

(57) ABSTRACT

A 6-axis road simulator test system is disclosed which allows for dynamic simulation of vehicles on road surfaces in a controlled environment for development or production testing conditions. The system turns the vehicle wheels, or provides resistance to turning of the wheels while subjecting each of the vehicle's wheel in up to 6-axis of displacement, based on road profile simulation.

20 Claims, 19 Drawing Sheets

6-AXIS ROAD SIMULATOR TEST SYSTEM

CROSS-REFERENCE TO RELATED APPLICATIONS

This application is a continuation-in-part application of pending PCT International Application PCT/IB03/02372 which was filed in the U.S. Receiving Office designating the United States on May 14, 2003, and published on Nov. 20, 2003 as WO 03/095966 A2. PCT International Application PCT/IB03/02372 claims the benefit of U.S. Provisional Application No. 60/380,401, filed May 14, 2002. The disclosure of the above applications is incorporated herein by reference.

FIELD OF THE INVENTION

The present invention relates to a vehicle test simulator, and more particularly to a flat road simulator for a land vehicle.

BACKGROUND OF THE INVENTION

Heretofore, methods for simulating an effective road profile in the testing of an automotive vehicle typically relied on a spindle-coupled road simulator. Spindle-coupled road simulators typically define a flat surface road plane in a multiple coordinate reference system to represent an effective road profile. These simulators often couple shakers and vertical actuators directly to the spindle of the vehicle. The spindle is excited over a predetermined range of motion to simulate the road. As spindle coupled actuators neglect the effects of tire loading on vehicle dynamics, they often are not effective in the simulation of certain driving conditions.

Another commonly used vehicle test apparatus includes an articulated running flat belt platform moveable so as to contact the tire, the flat tire contact plane defines a coordinate reference system to represent the effective road profile. It is known to apply actuating forces in a vertical direction to simulate road conditions. The use of these vertical forces does not, however, completely simulate extreme driving conditions.

While the above recited systems represent a significant advance in the vehicle simulation art, further advances are needed to overcome the above described problems.

SUMMARY OF THE INVENTION

A 6-axis road simulator test system is disclosed which allows for dynamic simulation of vehicles on road surfaces in a controlled environment for development or production testing conditions. The system turns the vehicle wheels, or provides resistance to turning of the wheels while subjecting each of the vehicle wheels in up to 6-Axis of displacement, based on road profile simulation or user.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
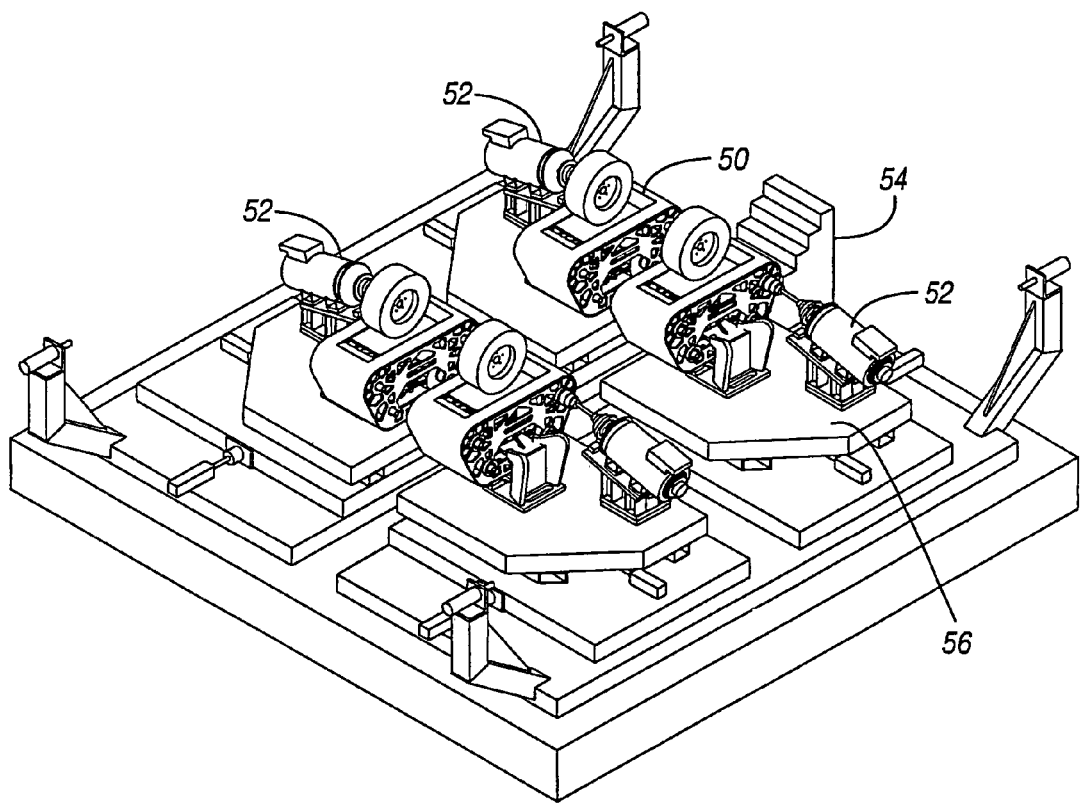
FIG. 1 discloses a perspective view of the road simulator according to an embodiment of the present invention.

The following description of the preferred embodiment is merely exemplary in nature and is in no way intended to limit the invention, its application, or uses. With general reference to FIGS. 1-26 and particular reference to FIG. 1 which discloses a perspective view of the road simulator 50 according to an embodiment of the present invention. The road simulator 50 is configured to simulate a road for a vehicle by inputting a simulation of a road into a vehicle's tires. Testing provided by the system can include, but is not limited to, vehicle dynamics, NVH (noise, vibration, and handling), rigidity, natural frequency of vehicle and suspension, etc. Production testing can include end-of-line testing of vehicle driving and/or braking functions.

These simulations are accomplished by the use of four individually controlled actuators (one per tire as needed). Each actuator is configured to use individual closed loop controls to vary the vehicle tire speed, and displacement of the tires with 6-axis of displacement. If desired, a single or pair of road simulators can be used to test vehicle sub-assemblies such as tires, wheels, an individual axle, suspension assembly, or a complete vehicle.

All displacement and speed drives are integrated into the actuators. The input signal simulating the road can be computer generated or can be taken from acceleration data from inside an exemplary vehicle traveling down the test road. Examples of this data include data from the vehicle interior, suspension data, tire data, etc. Any of the above input data is mathematically correlated to an actual road profile.

Each of the individual actuators has an associated water cooled drive motor 52 for quiet operation that is coupled to a drive shaft by a flexible coupling 54. The flexible coupling 54 is preferably an extensible constant velocity joint that allows the motor 52 to be mounted to the base 56 of the system, while the actuator is suspended on a support member. Additionally, each actuator has a driven belt 58 for either driving or resisting the rotation of the vehicle's tires. The driven belt 59 (as detailed herein) is supported by two to four drums 60 and a bearing 62 disposed immediately below the belt 58 wheel interface. The bearing is optionally hydrostatic and can be a high pressure air-bearing (25 to 30 bar). The drums and belt can be steel or some other material such as a reinforced polymer.

Figure 2:
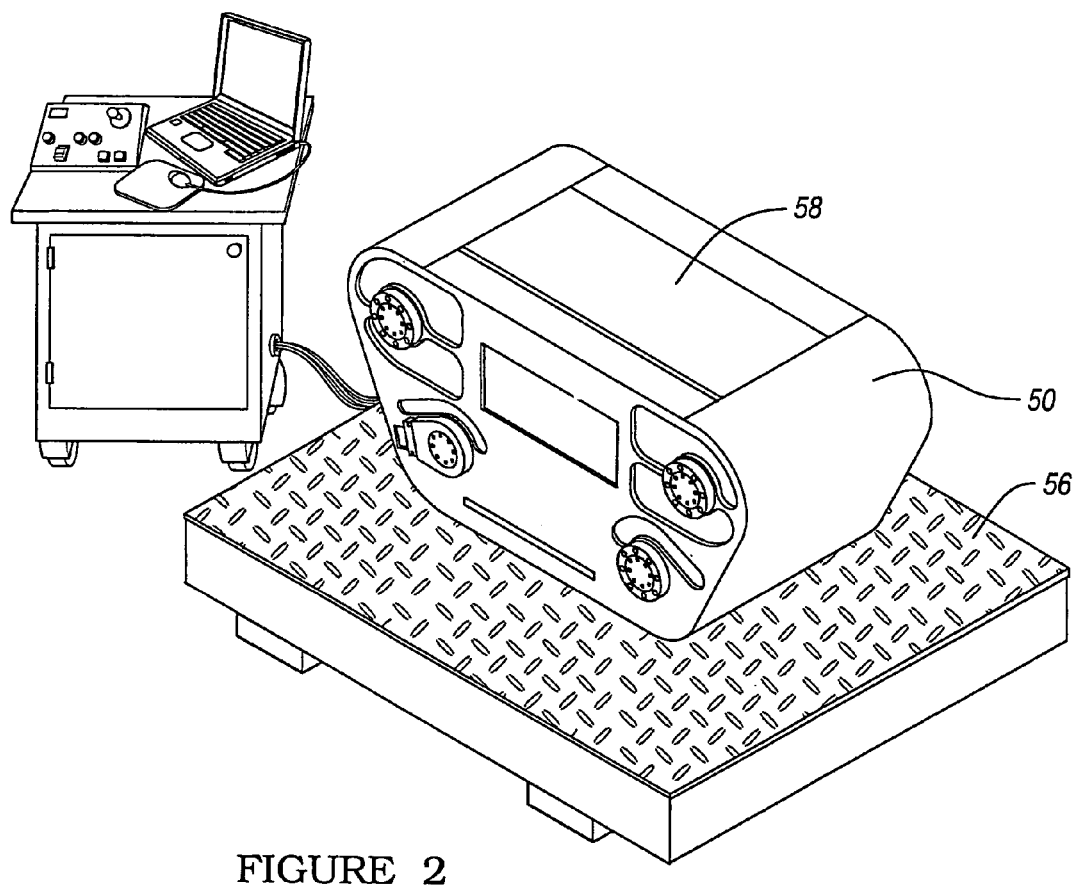
FIG. 2 shows a perspective view of a single road simulator actuator according to the teachings of the present invention.

FIG. 2 shows a perspective view a single road simulator actuator 50 according to the teachings of the present invention. The road simulator 50 contains closed loop controls of a vehicle's tire speed, traction control and braking force on the belt, as well as up to 6-axis of displacement. These feedback controls can be incorporated into the system controller, or can be incorporated directly into the individual actuators. The test system utilizes a controller which contains electrical/electronics, data acquisition system, and software. The controller is accessible through typical networking means such as Ethernet and functions to individually control each of the actuators.

The controller 61 utilizes sensors to measure the speed of the driven belt and/or the vehicles wheel. In measuring the rotational velocity of the wheel or the belt, it is envisioned that sensors such as magnetorestrictive, optical, magnetic, and capacity sensors can be used. Additionally, where available, the system can utilize data from the test vehicle's anti-lock braking system or traction control system to measure wheel velocity. The driving roller additionally integrates torque and speed measurement.

Figure 22:
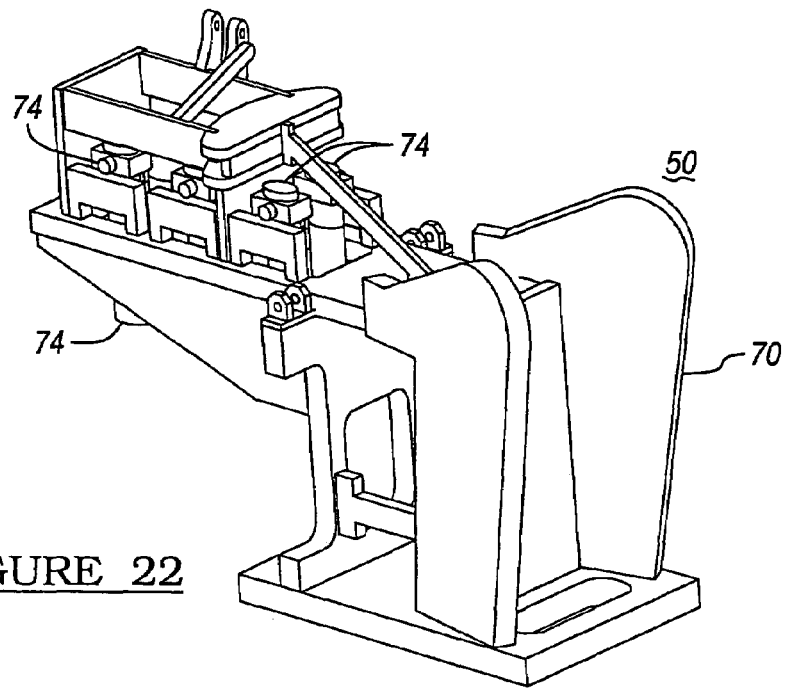
FIG. 22 depicts a base structure according to the teachings of the present invention.
Figure 23:
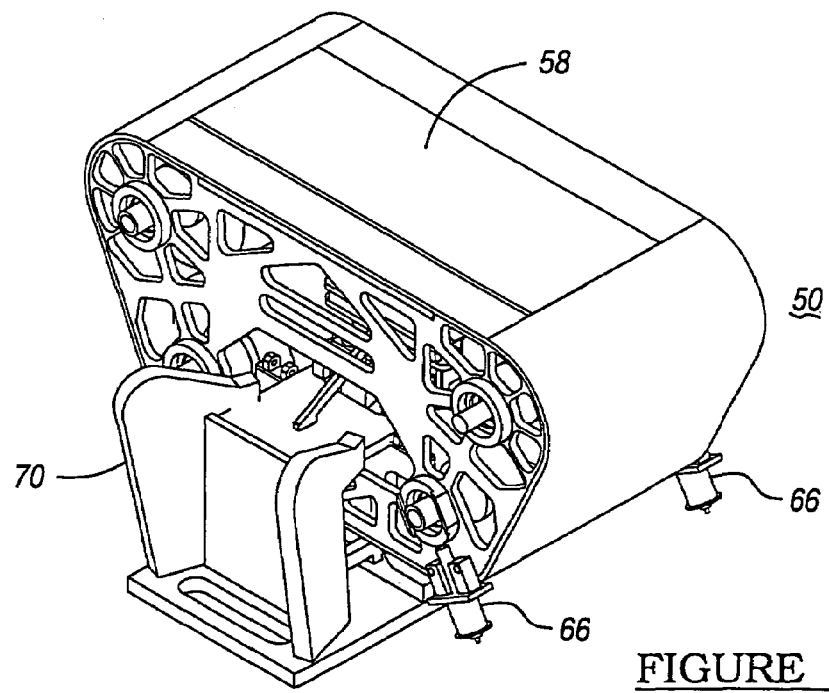
FIGS. 23-26 represent rear perspective views of the simulator shown in FIG. 18.
Figure 24:
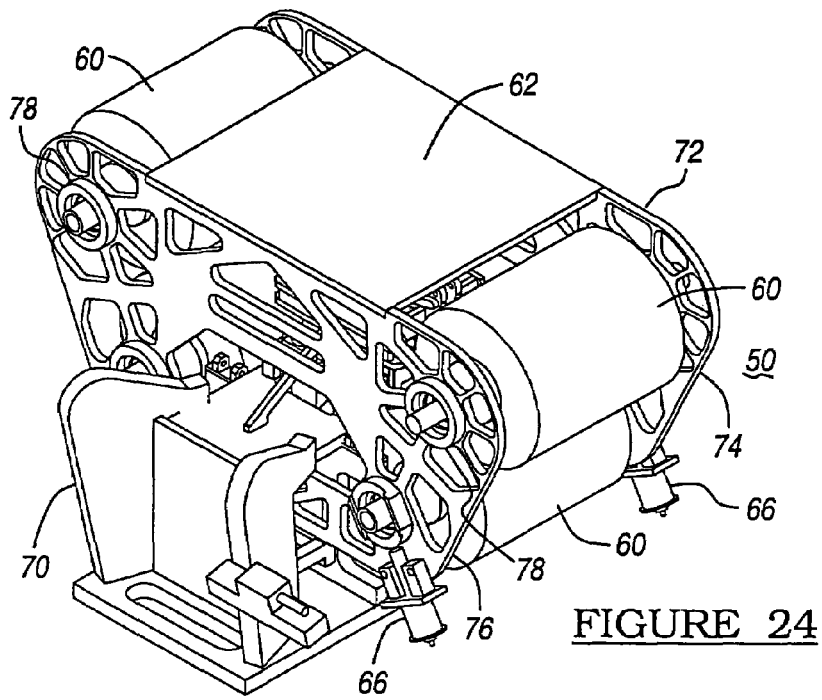
Figure 25:
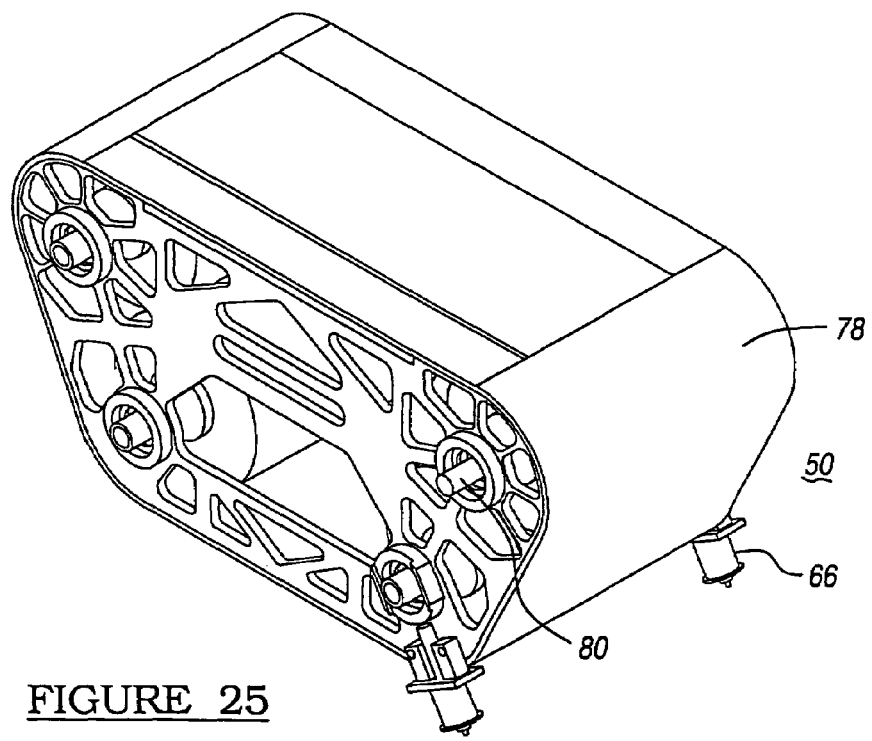
Figure 26:
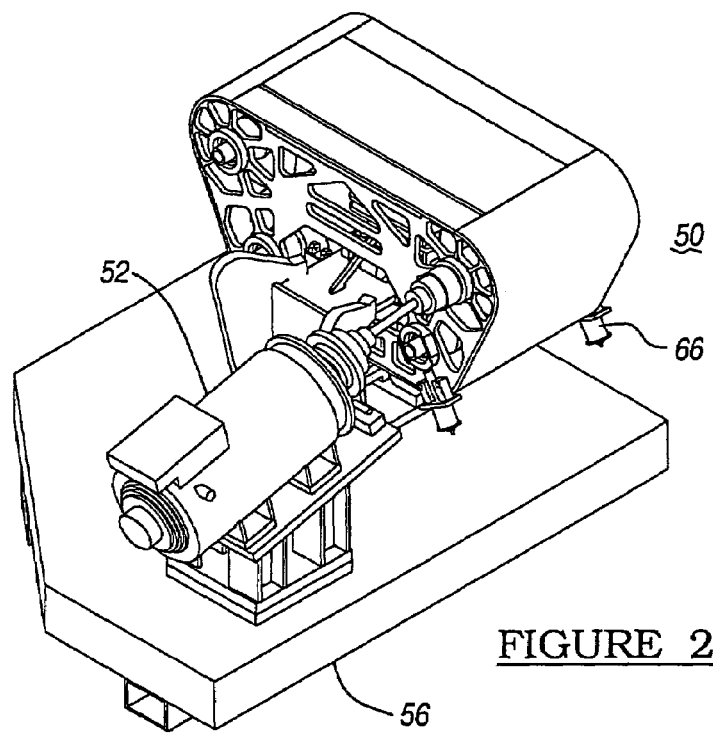
Figure 27:
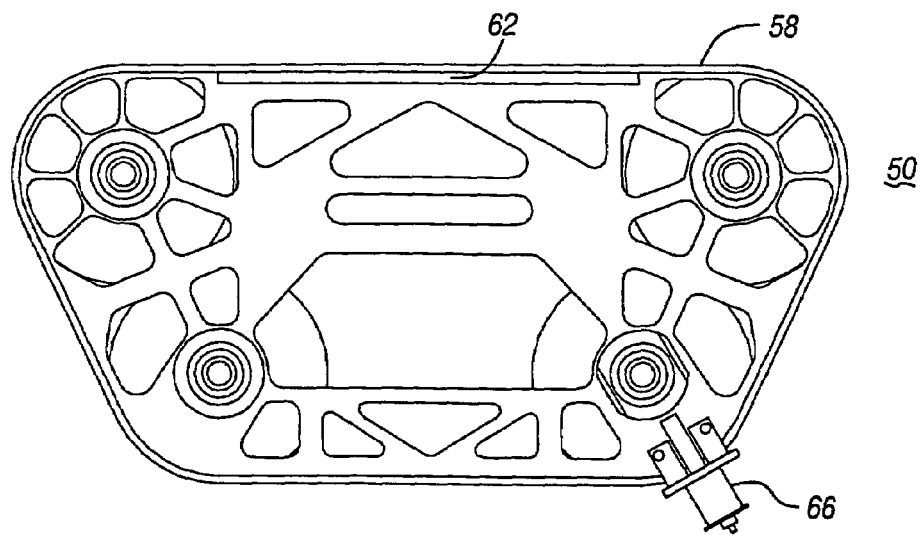
FIG. 27 depicts a rear view of the actuator superstructure.

Each road simulator actuator 50 has a carrying capacity of over 50 kg. In the case of a vehicle passenger car or trucks an road simulator actuator can have a carrying capacity of over 1500 KG. In addition to being able to provide greater than +/−50 mm displacement along the X, Y, and Z axis, each actuator is capable of providing angular displacement (RX, RY, and RZ axis) of greater than six degrees. As best seen in FIG. 22, a plurality of hydraulic actuators 64 are incorporated into the road simulator actuator 50 are capable of providing acceleration at 35 G's at frequencies reaching about 25 HZ of the carrying capacity of the road simulator actuator.

In the case of a vehicle passenger car or trucks an road simulator actuator belt is a 400 mm wide steel or reinforced polymer belt, which is capable of imparting a traction force of up to about 7000 N on a vehicle's wheel, and is capable of simulating road speeds of up to about 250 KPH. Software incorporated into the controller allows for programming of the tire centerline anywhere along the length of each corner unit, and above the corner unit.

Figure 3:
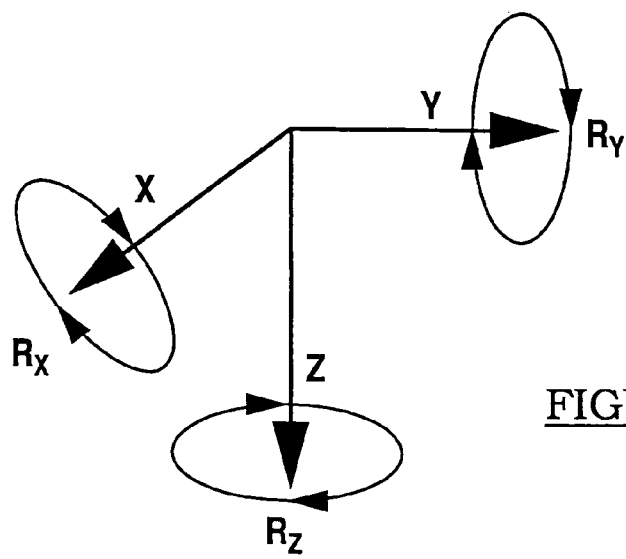
FIG. 3 depicts the definition of the 6-axis of freedom afforded by the road simulator shown in FIG. 2.

FIG. 3 depicts the definition of the 6-axis of freedom afforded by the road simulator shown in FIG. 2. Each road simulator actuator 50 weighs approximately 250 KG. Provided within each road simulator actuator is a hydraulic (automatic) or manual belt tension adjustment 66. This system allows for the automatic adjustment of the tension of the belt depending on the varying vehicle parameters such as vehicle weight or speed. Further, it allows for quick belt removal. An associated hydraulic system (not shown), including the accumulator, is incorporated into the base of each road simulator actuator.

Figure 4:
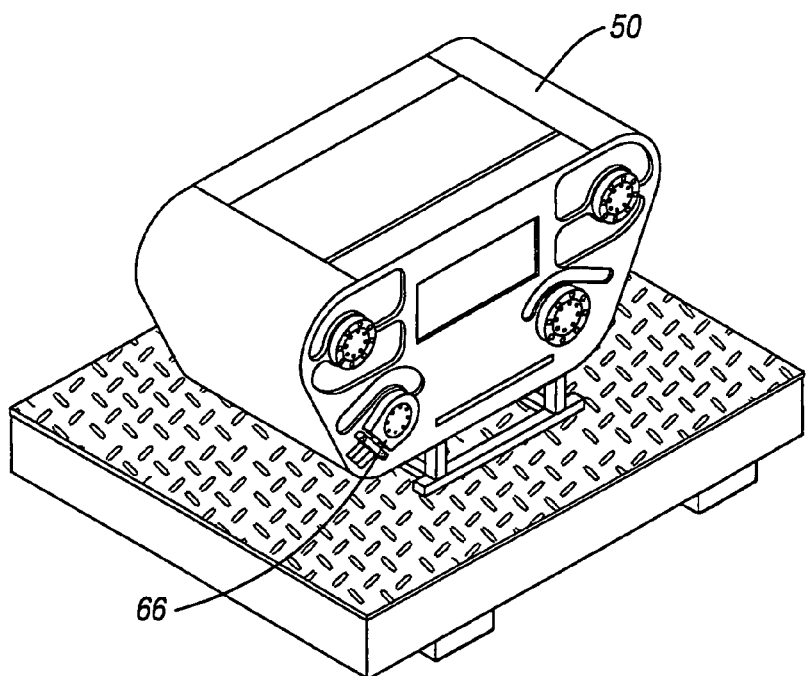
FIG. 4 depicts a front perspective view of the actuator shown in FIG. 2.
Figure 5:
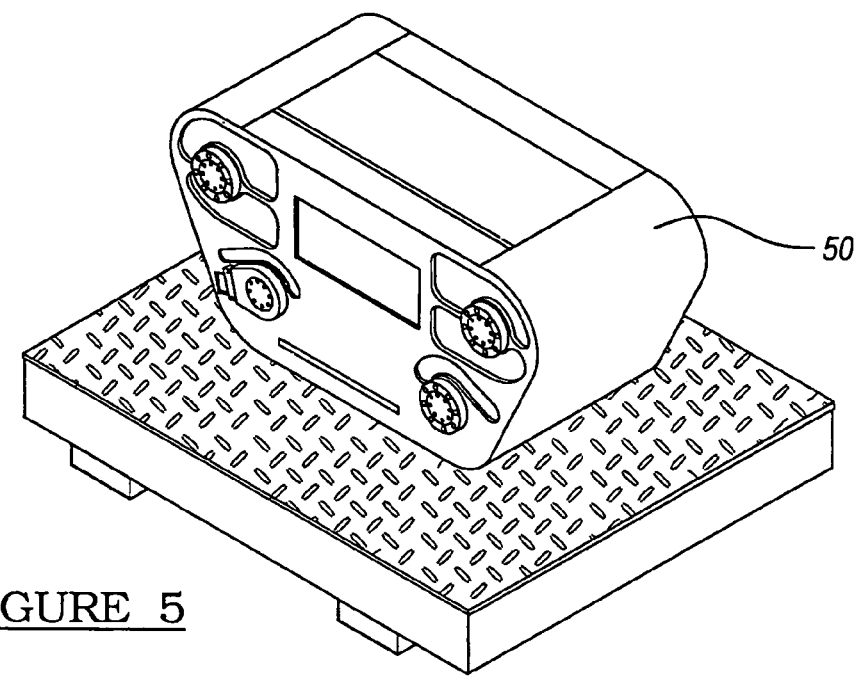
FIG. 5 is a top perspective view of the actuator shown in FIG. 2.
Figure 6:
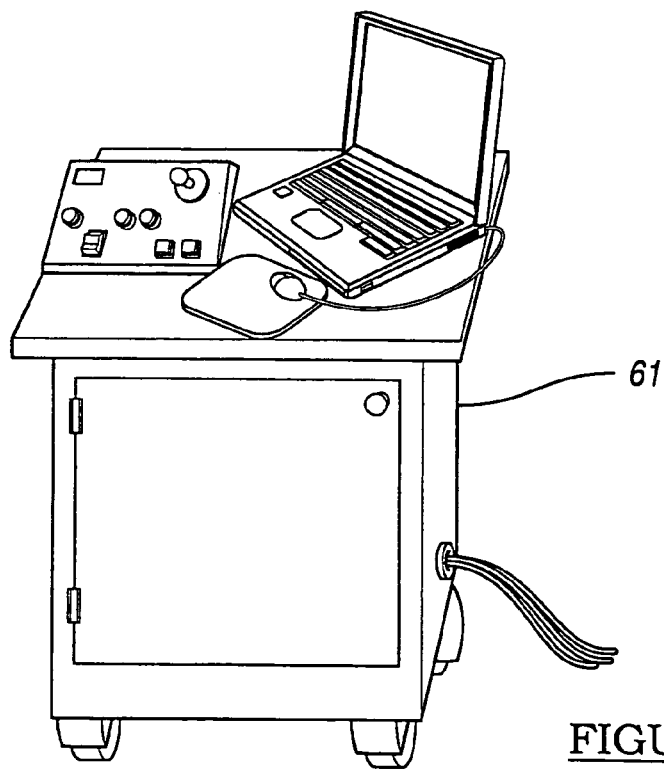
FIG. 6 is a view of the control console coupled to the actuator in FIG. 2.

FIGS. 4-6 depict a front and top perspective views of the road simulator actuator according to the teachings of one embodiment of the present invention. The actuator head is generally a trapezoidal or cylindrical structure having top, side, and front and back surfaces. Incorporated into the top surface is the belt. Shown on the front surface are the support structures for the internal drums and bearings which support the belt. Also shown on the front surface is the belt tensioning mechanism. The belt tensioning system 66 incorporates an actuator which applies forces to a bearing supporting the belt. The tension on the belt can be automatically adjusted by the controller utilizing the hydraulic or pneumatic automatic belt tensioner 66.

Figure 7:
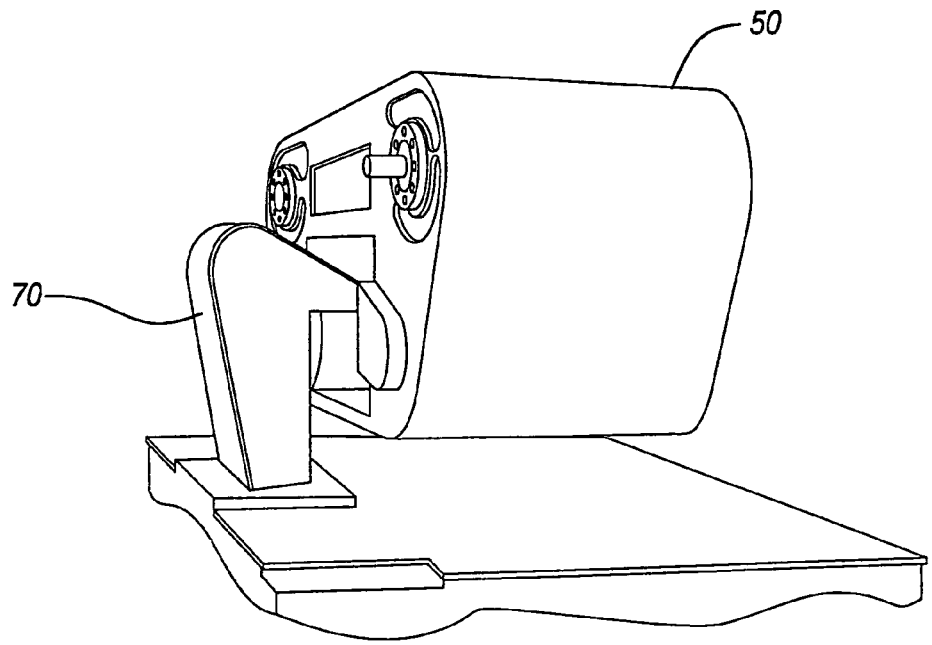
FIGS. 7-9 are rear perspective views of the actuator shown in FIG. 2.
Figure 8:
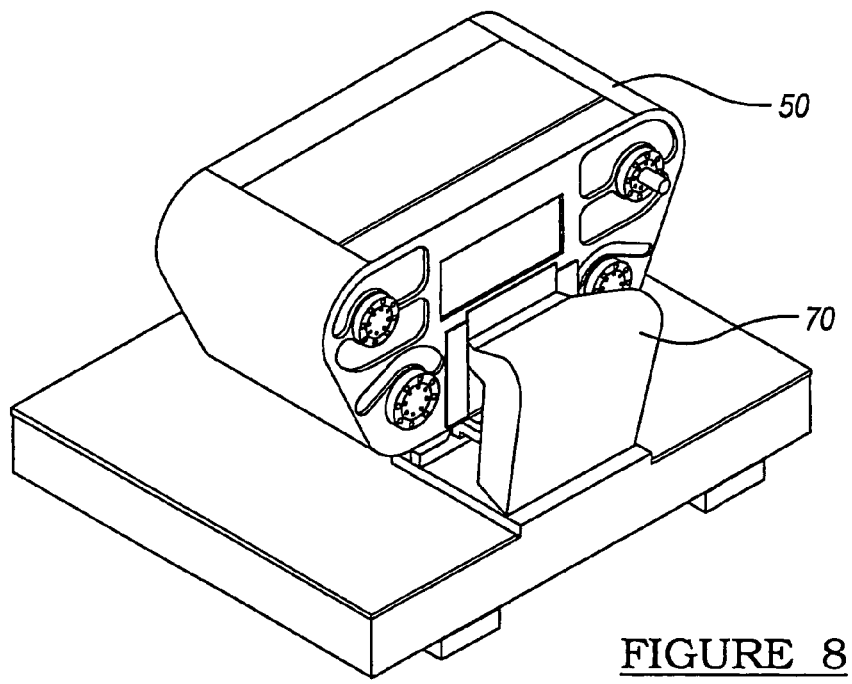
Figure 9:
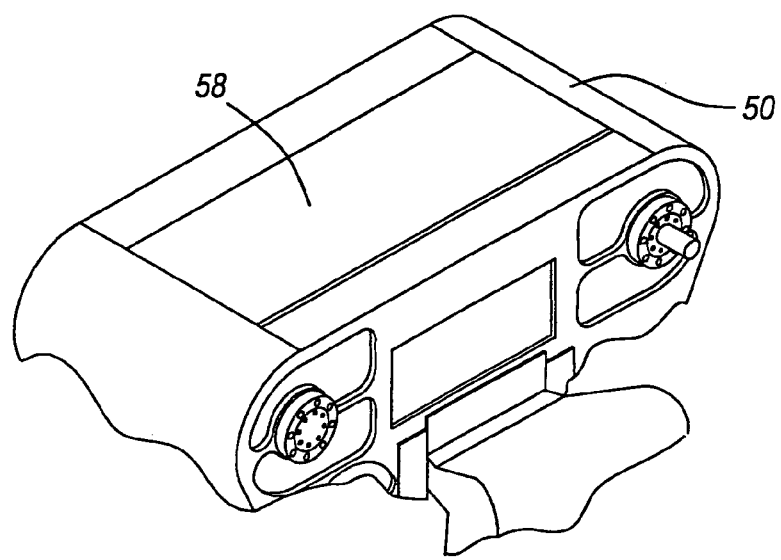

FIGS. 7-9 are rear perspective views of the actuator shown in FIG. 2. The road simulator actuator is shown suspended above the base by a suspension arm. The suspension arm functions to hold the actuator above the base while allowing the actuator to float. A number of hydraulic actuators are disposed between the suspension arm and the actuator head. As depicted best in FIG. 7, a driveshaft is coupled to a drive frame disposed within the actuator. The drive shaft is additionally coupled to the drive motor through the flexible coupling such as a cv-coupling.

Figure 10:
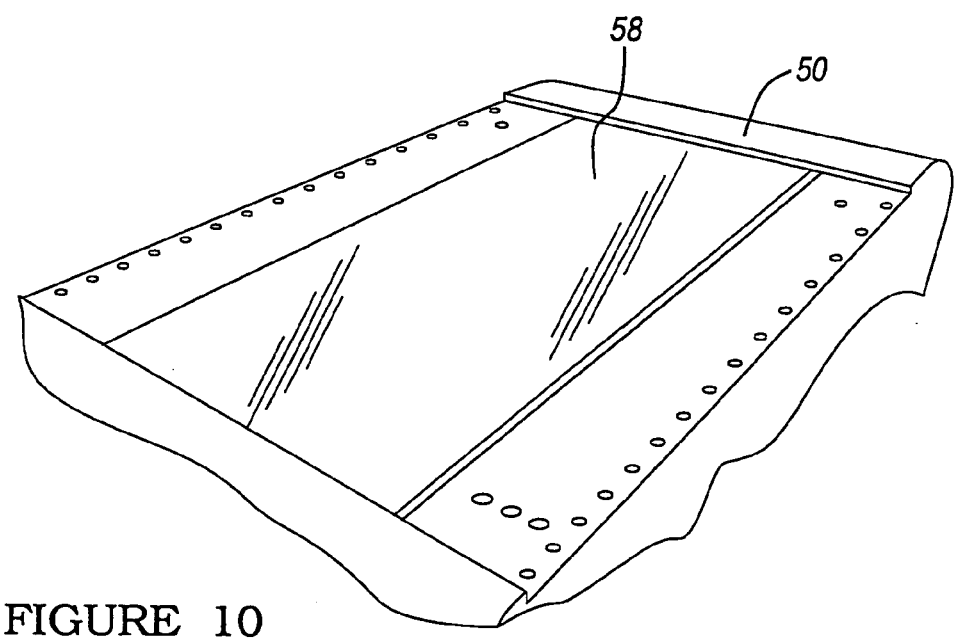
FIG. 10 is a top view of the actuator shown in FIG. 2.

FIG. 10 is a top view of the actuator. Shown is the continuous loop belt 58, which functions simulate the road surface as seen by the tires. Additionally, the belt is configured to be able to impose drag onto the tires, should test conditions require. It is envisioned that the belt can be formed of metallic materials such as woven or sheet steel or can be made of synthetic materials. Additionally, the belt can have a three dimensional surface which interacts with the surface of the tire. It is envisioned that this surface can simulate a gravel road or a series of rumble strips.

FIGS. 11-14 are internal views of the simulator. Shown are two support drums 60 which function to support the belt 58. Not shown are two optional additional drums 60'. The first additional drum functions to support the belt, while the second additional drum is a drive drum. The drive drum is coupled to the flexible coupling 54 through the drive shaft. Additionally shown are the hydraulic actuators 64 which are disposed between the support arm 70 and the road simulator actuator. These hydraulic actuators 64 function to impart the forces onto the vehicle tires by applying forces through the hydrodynamic bearing 62 of the road simulator actuator.

Figure 11:
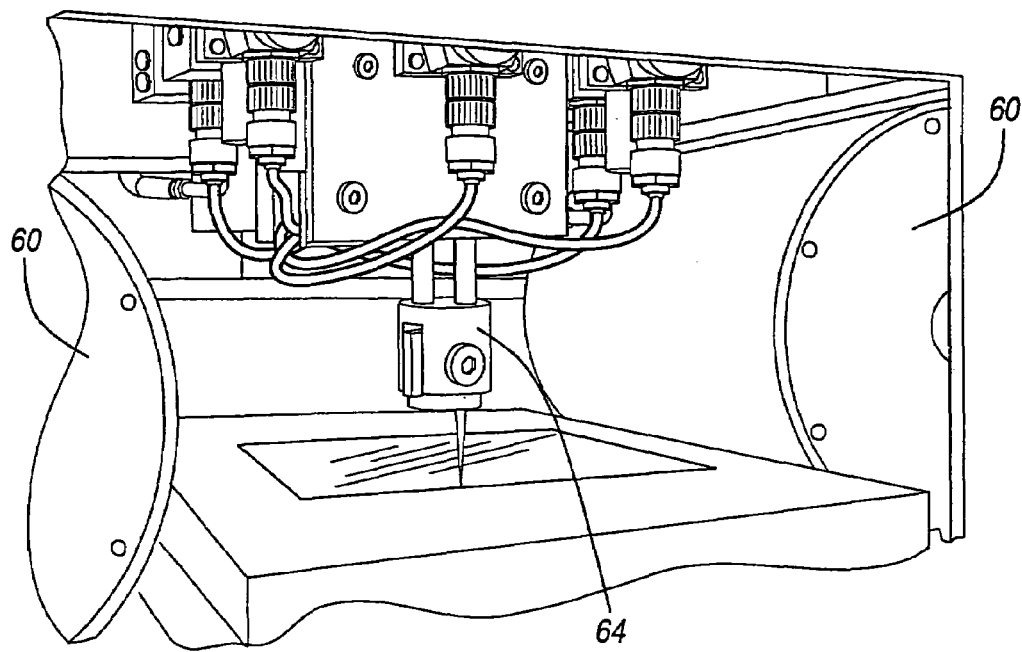
FIG. 11 is an internal view of the simulator shown in FIG. 2.
Figure 12:
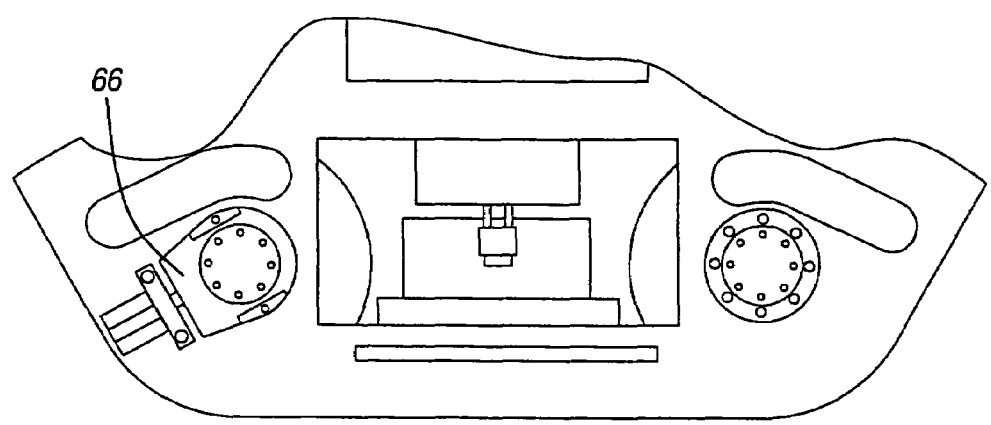
FIGS. 12-14 are a close-up view of the hydraulic actuators with closed loop controls.
Figure 13:
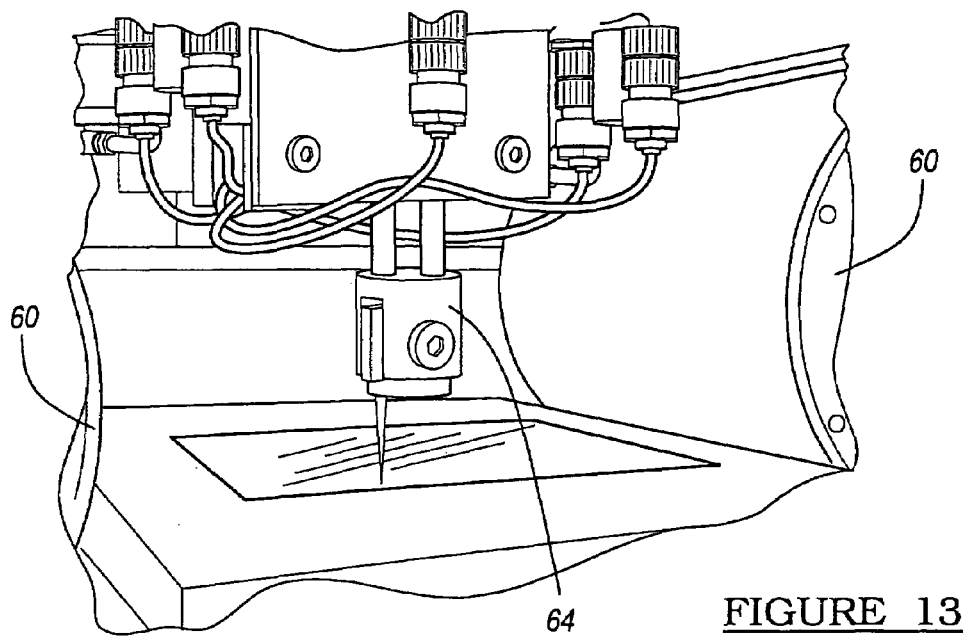
Figure 14:
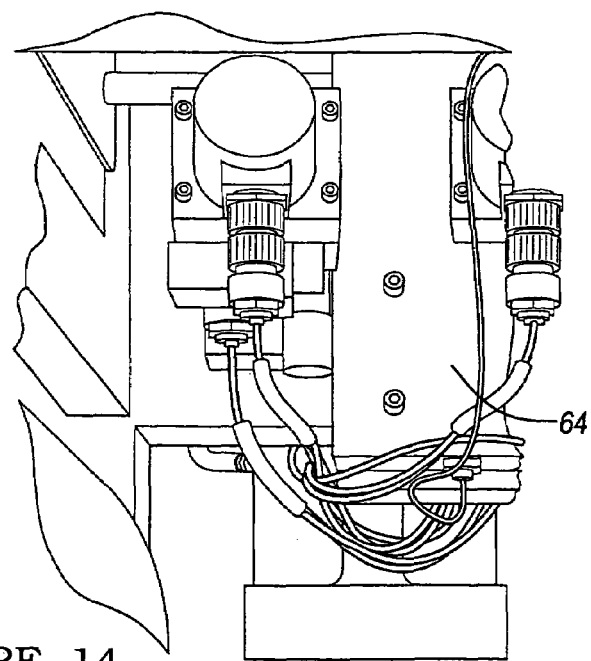

FIG. 11 depicts an internal view through the front surface of the road simulator actuator. Shown is the automatic belt-tensioner 66 which applies forces to one support drum 60. The automatic belt-tensioner 66 functions to automatically adjust the tension of the driven belt. The belt-tensioner 66 further is configured to allow the decoupling of the drive belt from the support drums.

Figure 15:
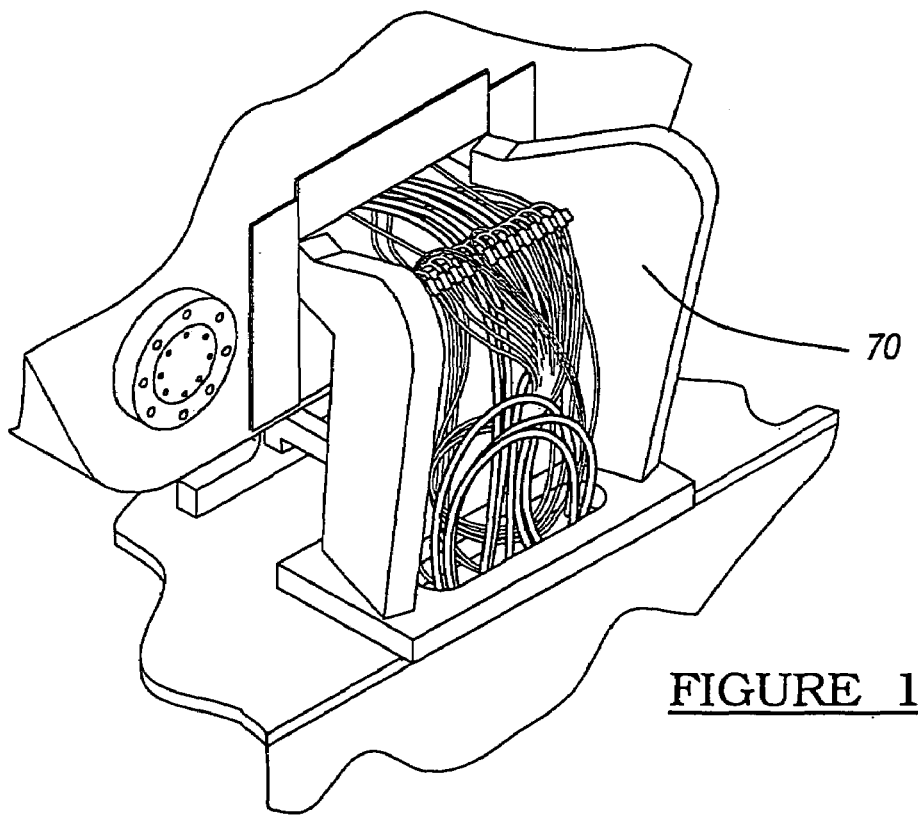
FIGS. 15 and 16 are depictions of the suspension arm.
Figure 16:
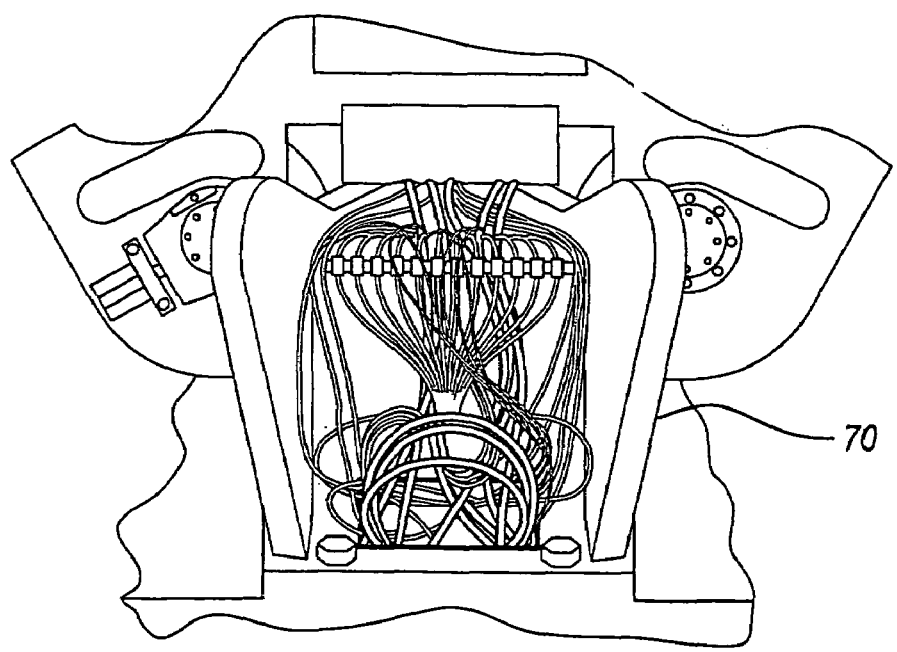
Figure 17:
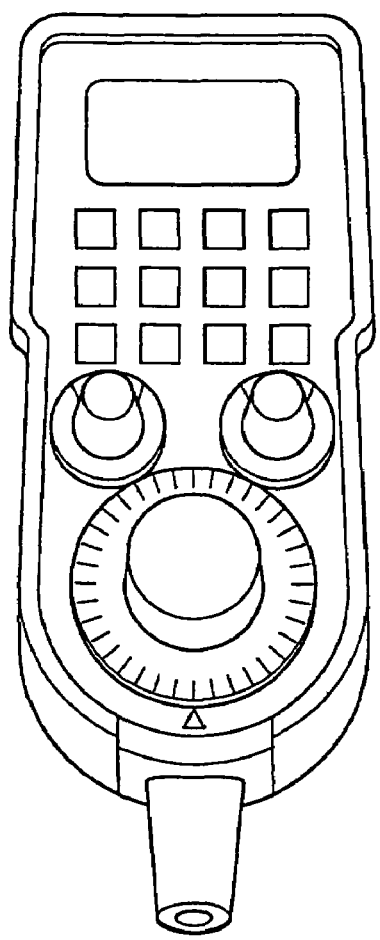
FIG. 17 is a depiction of a remote control device coupled to the controller.
Figure 18:
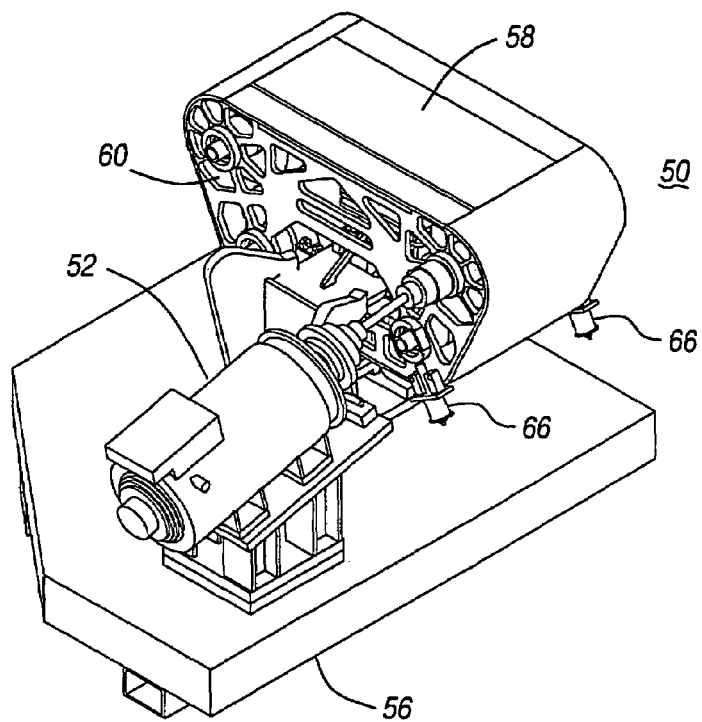
FIG. 18 depicts a rear perspective view of the system according to the teachings of the present invention.
Figure 19:
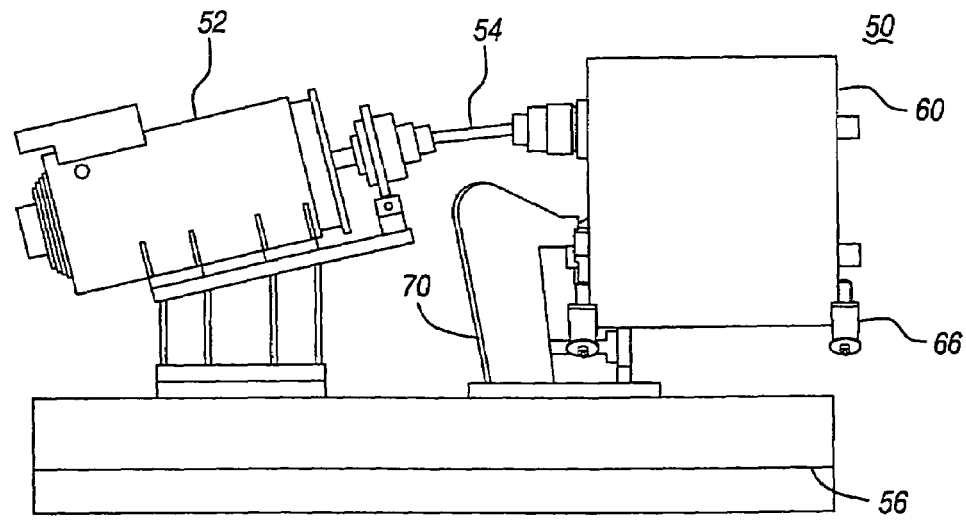
FIG. 19 depicts a side view of the system shown in FIG. 18.
Figure 20:
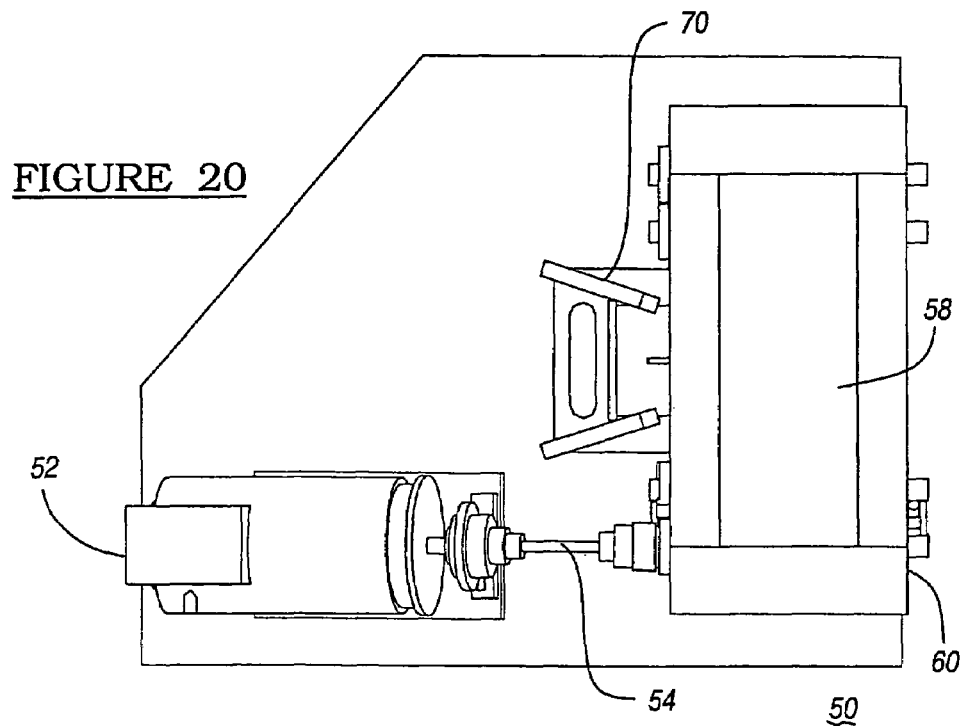
FIG. 20 shows a top view of the system shown in FIG. 18.
Figure 21:
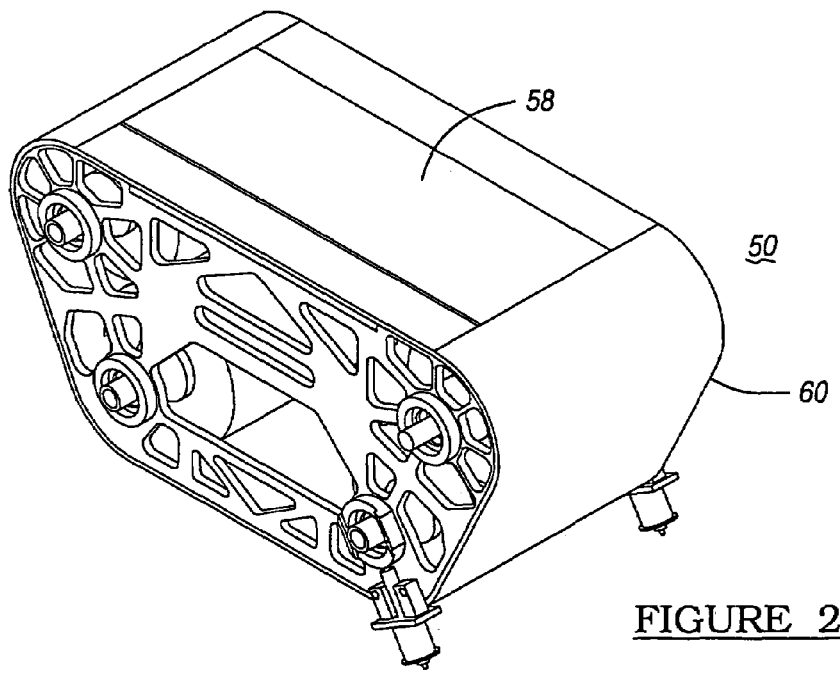
FIG. 21 represents a superstructure of the simulator according to the teachings of the present invention.

FIGS. 15, 16, and 22 are depictions of the actuator's suspension arm 70. The suspension arm functions to support the road simulator actuator 50 and to act as a conduit for control and feedback signals. Additionally, the hydraulic and pneumatic fluids can be supplied from the hydraulic accumulator in the base of the road simulator actuator. FIG. 17 is a depiction of a remote control device coupled to the controller.

Figure 28:
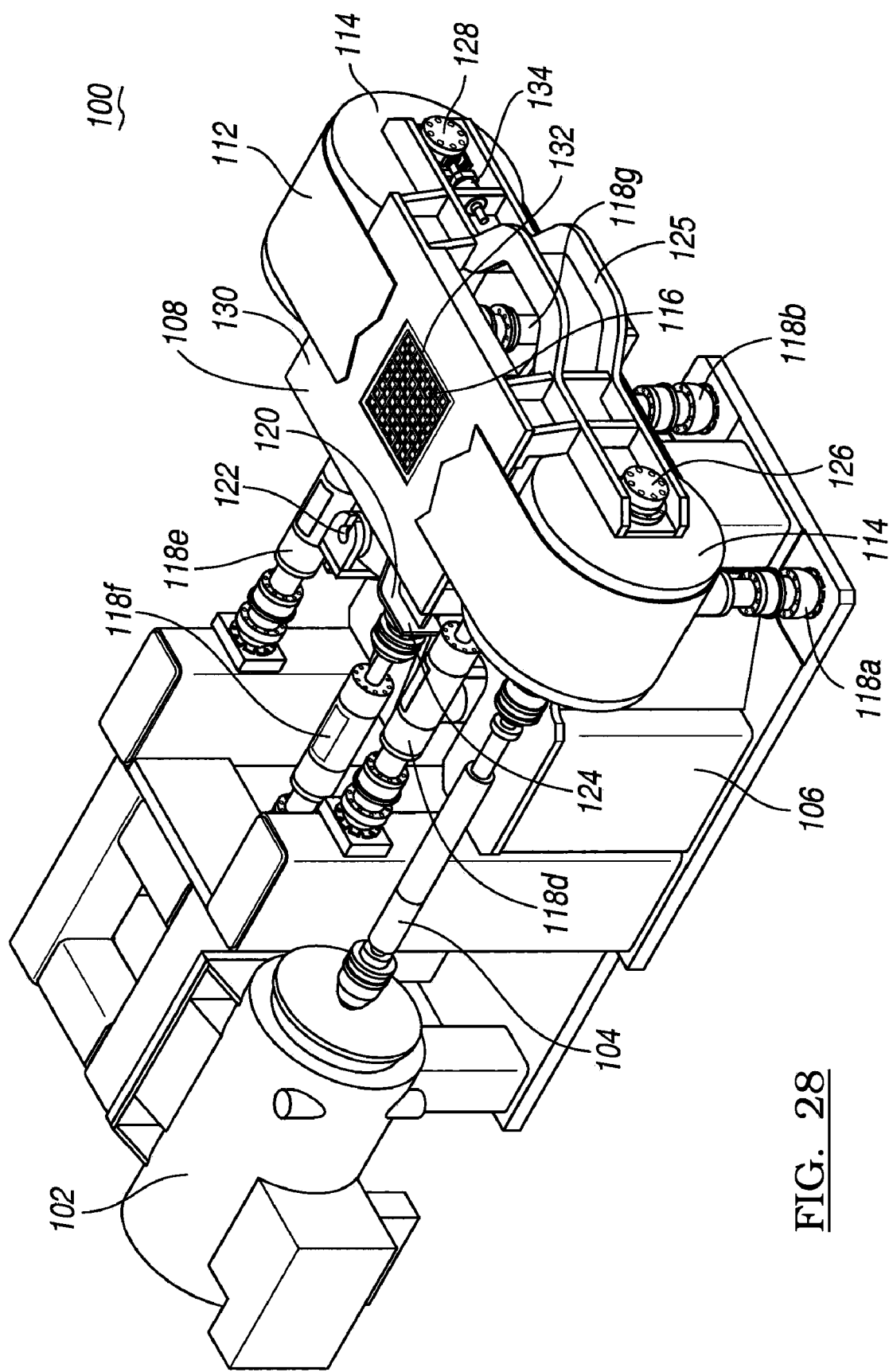
FIG. 28 represents a front perspective view of the simulator according to the teachings of an additional embodiment of the invention.
Figure 29:
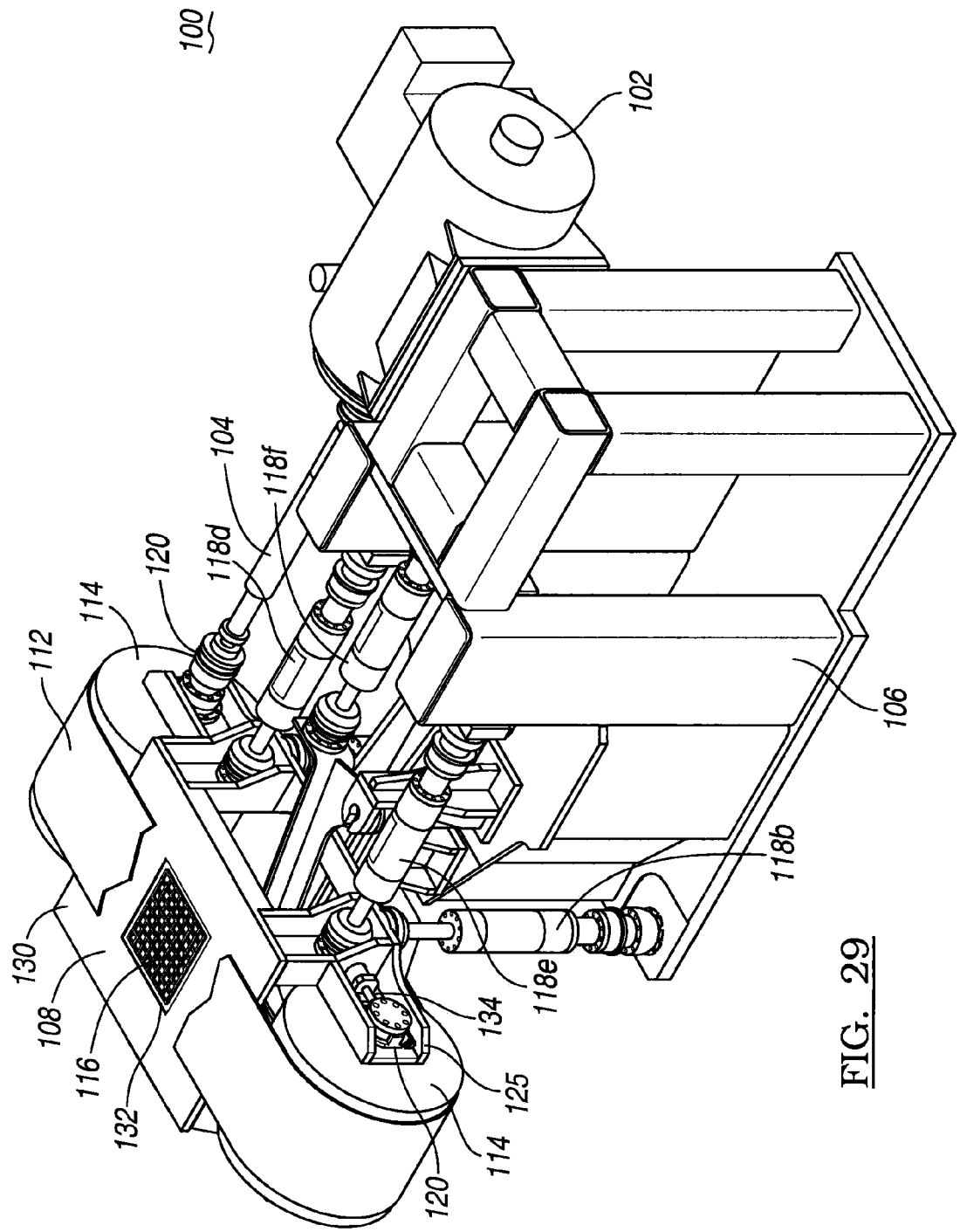
FIG. 29 represents a rear perspective view of the simulator shown in FIG. 28.

FIGS. 28 and 29 disclose perspective front and rear views of a vibration actuator 100 according to a second embodiment of the present invention. The actuator 100 is used with a controller 61 as described above, and is configured to simulate a road for a vehicle by inputting a simulation of a road into a vehicle's tires. Testing provided by the system can include, but is not limited to, vehicle dynamics, NVH (noise, vibration, and handling), rigidity, natural frequency of vehicle and suspension, etc. Production testing can include end-of-line testing of vehicle driving and/or braking functions.

The vibration actuator 100 and has an associated water cooled drive motor 102 for quiet operation, which is coupled to a drive shaft by a constant velocity coupling 104. The constant velocity coupling 104, allows the motor 102 to be mounted to the base 106 of the system, while an actuator head 108 is suspended on a support member or arm 110. Each actuator head 108 has a driven belt 112 for either driving or resisting the rotation of the vehicle's tires. The driven belt 112 is supported by a pair of drums 114 and a bearing 116, which is optionally a hydrodynamic bearing. The bearing 116 is disposed immediately below the belt wheel interface. Optionally, the bearing 116 may be a high pressure bearing (e.g. from about 25 to 30 bars). The system is configured to measure force in the X, Y and Z-axis on the rolling belt. The driving roller optionally integrates torque and speed measurement.

Figure 30:
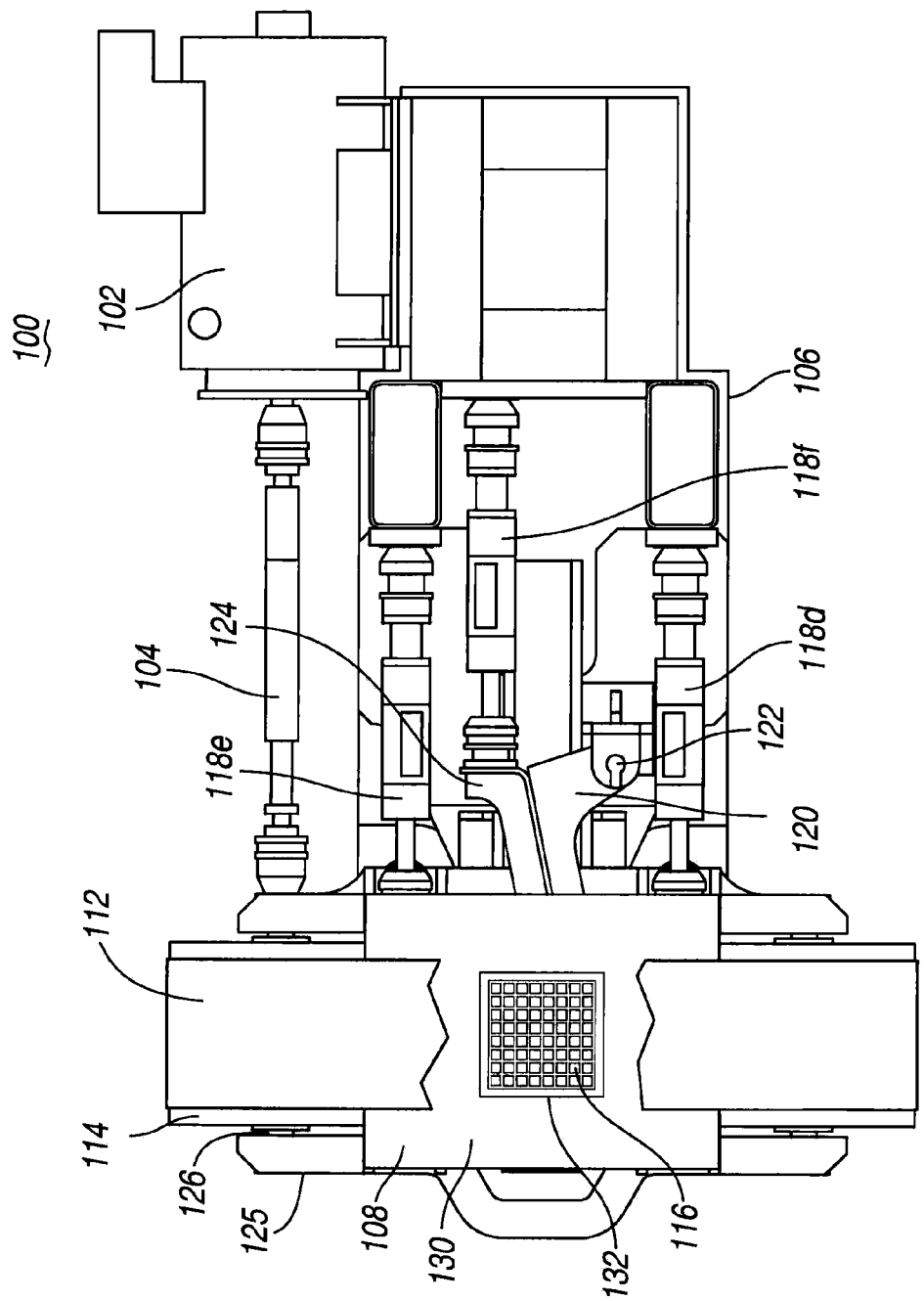
FIGS. 30 and 31 represent top and front views of the simulators shown in FIG. 28.

As best seen in FIGS. 29 and 30, the vibration actuator 100 has six hydraulic actuators 118a-f. The actuators 118a-f function at the pressures of between about 200 or 300 bars. There are two or three actuators which apply forces to the actuator head 108 in the Z axis (118a-c), two in Y axis (118d-e) and one in X axis 118f. In this regard, forces to the actuator head 108 in the z direction are transmitted through a generally curved actuator arm 120. The actuator arm 120 is pivotably coupled at a pivot point 122 on the base. Actuator 118f is positioned generally parallel to Y axis actuators 118d and is configured to apply forces to a first end 124 of the curved actuator arm 120. This allows for the base to be reinforced on a single side and significantly reduces the complication of the control and fluid line assembly. A second end of the actuator arm 120 (not shown) is coupled to the actuator head 108. The lengths of lever arms formed by the pivoted actuator arm 120 can be adjusted to displacements and force loads depending on the weight of the head and the type of actuators 118 being used.

An optional seventh actuator 118g is a hydraulic cylinder located between the air bearing 116 and the actuator head 108. Actuator 118g is positioned within a guide to allow only Z-axis displacement. The additional cylinder 118g is configured to provide high frequency displacement (vibration simulation from 50 Hz to 150 Hz) with small stroke (about +/−5 mm) directly to the driven belt, and thus the test vehicle tire, without needing to displace the whole actuator head 108. For vibrations of less than 50 Hz, the main Z-axis actuators 118 a-c are used. The actuators are coupled to the actuator head 108 by hydrostatic ball-joints which do not create vibration noise at high frequency motion. The relative rotation allowed by these ball-joints is about 20° in any direction.

The actuators 118a-f are generally configured to move an actuator head 108 having a mass of greater than about 250 Kg. Actuators 188d-f are configured to apply X & Y axis dynamic forces of greater than 35 kN, while the actuator 118a-c are configured to apply dynamic forces of greater than 70 kN. Actuators 118d-f are configured to apply X & Y axis displacements of greater than +/−50 mm, while the actuator 118a-c are configured to displacements of from about +/−50 mm to +/−150 mm. The actuator 100 provides angular displacements Rx, Ry, and Rz of greater than +/−6 Deg using multiple off axis actuators. Additionally, the actuator provides X & Y axis accelerations of +/−150 m/s$^2$ and Z axis acceleration of +/−350 m/s$^2$ and a maximum motion frequency from 50 Hz to 100 Hz.

Figure 31:
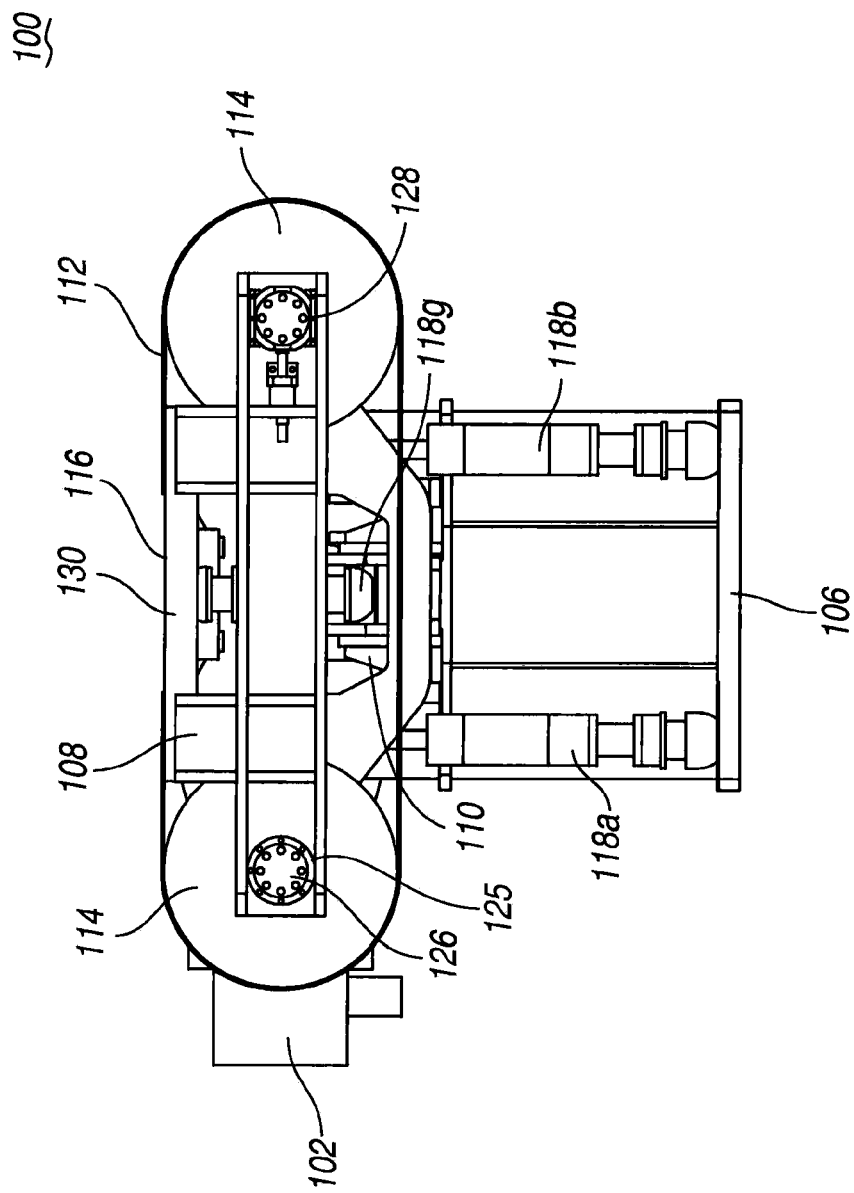

As best seen in FIG. 31, the actuator head 108 is generally oval shaped and formed on a frame 125 which supports the pair of drums 114 using bearings 126. The frame additionally supports an automatic belt tensioning mechanism 128 formed of a pair of actuators 134 which can dynamically adjust the tension of the belt. The automatic belt tensioning mechanism 128 adjusts the tension of the driven belt as a function of at least one of belt speed, belt tension or wheel speed. The tensioning mechanism 128 also allows for real time lateral guiding of the driven belt with closed loop control. In this regard, the system is configured to use sensors to determine if the belt is in an incorrect position and uses tensioning mechanism to dynamically adjust the lateral placement of the belt.

The actuator head 108 additionally as a platen surface 130 that functions to slidably support the rotating belt. The platen surface 130 functions as the dynamic input surface for the whole vehicle road simulator. Disposed within this surface 130 is an aperture 132 which holds the bearing 116 which preferably a porous type bearing surface and a guide for the optional Z-axis actuator 118g.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for simulating a road test of an automotive vehicle on a simulator adapted to receive the vehicle thereon, the system comprising:
   electronic memory for storing a set of data representing a desired response from a source vehicle driven over a road surface; and
   at least one road simulator actuator, having an actuator head supporting a belt configured to drive a wheel on the vehicle, and further having a first plurality of hydraulic actuators capable of imparting forces in a first direction onto the head in response to the data, a second plurality of hydraulic actuators capable of imparting forces in a second direction onto the head in response to the data, and a third hydraulic actuator capable of imparting forces in a third direction onto the head in response to the data, and wherein the hydraulic actuators are configured to move the head in 6 axes of freedom; and
   an automatic belt-tensioner configured to apply forces to at least one support drum in communication with the belt, and wherein said automatic belt-tensioner functions to automatically adjust the tension of the belt as a function of at least one of belt speed, belt tension or wheel speed, wherein the tensioning mechanism allows for real time lateral guiding of the belt with closed loop control.

2. The system according to claim 1 further comprising a fourth actuator configured to impart forces between the actuator head and the belt in the first direction.

3. The system according to claim 1 wherein the road simulator actuator is configured to control at least one of vehicle dynamics, noise, vibration, handling, rigidity, natural frequency of vehicle and suspension.

4. The system according to claim 1 further comprising a closed loop control to vary the vehicle tire speed, and displacement of the tires with up to 6-axis of displacement.

5. The system according to claim 1 further comprising an input signal simulating a road which is computer generated.

6. The system according to claim 1 further comprising an input signal simulating the road which is taken from acceleration data from inside an exemplary vehicle, traveling down a test road.

7. The system according to claim 5 wherein the input signal is mathematically correlated to an actual road profile.

8. The system according to claim 1 wherein the road simulator actuator has associated water cooled drive motor, which is coupled to a drive shaft by an extensible flexible coupling.

9. The system according to claim 8 wherein the flexible coupling allows the motor to be mounted to a base of the road simulator actuator, while the actuator is suspended on a support member.

10. The system according to claim 1 wherein each actuator has a belt for driving and resisting the rotation of the vehicle's tires.

11. The system according to claim 1 comprising an actuator arm disposed between the third actuator and the actuator head, said actuator arm being pivotably coupled to a base.

12. The system according to claim 11 wherein the actuator arm is curved.

13. The system according to claim 11 wherein the third hydraulic actuator imparts forces in the second direction.

14. The system according to claim 1 wherein the belt is supported by two drums.

15. The system according to claim 1 wherein the first plurality of actuators are configured to apply dynamic forces of greater than 70 kN.

16. The system according to claim 1 wherein the second plurality of actuators are configured to apply dynamic forces of greater than 35 kN.

17. The system according to claim 1 wherein the first plurality of actuators are configured to displacements of-from about +/−50 mm to about +/−150 mm.

18. The system according to claim 1 wherein the second plurality of actuators are configured to-displacements of from about +/−50 mm.

19. The system according to claim 1 wherein the road simulator actuator has a carrying capacity of up to about 1500 KG and wherein the road simulator actuator is configured to provide greater than +/−50 mm displacement along the X, Y, and Z axis, the road simulator actuator is capable of providing angular displacement of greater than +/−6 degrees.

20. The system according to claim 1 wherein the hydraulic actuators are disposed between a support arm and the actuator head, and wherein the hydraulic actuators function to impart the forces onto the vehicle tires by applying forces through the interior surface of the road simulator actuator.

* * * * *